US010137802B2

(12) United States Patent
Cuddihy et al.

(10) Patent No.: US 10,137,802 B2
(45) Date of Patent: Nov. 27, 2018

(54) DETECTING OCCUPANT PRESENCE ON A VEHICLE SEAT

(71) Applicant: Ford Global Technologies, LLC, Dearborn, MI (US)

(72) Inventors: Mark A. Cuddihy, New Boston, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 15/067,470

(22) Filed: Mar. 11, 2016

(65) Prior Publication Data

US 2017/0259698 A1    Sep. 14, 2017

(51) Int. Cl.
*B60N 2/00* (2006.01)
*B60N 2/90* (2018.01)
*G01G 19/414* (2006.01)

(52) U.S. Cl.
CPC ............ *B60N 2/002* (2013.01); *B60N 2/914* (2018.02); *G01G 19/4142* (2013.01)

(58) Field of Classification Search
CPC ........... B60N 2/002; B60N 2/06; B60N 2/914
See application file for complete search history.

(56) References Cited

U.S. PATENT DOCUMENTS

| | | | | |
|---|---|---|---|---|
| 4,655,505 A * | 4/1987 | Kashiwamura | ........ | A47C 7/467 297/284.6 |
| 4,833,614 A * | 5/1989 | Saitoh | .................. | B60N 2/0224 296/65.16 |
| 5,129,704 A * | 7/1992 | Kishi | .................... | B60N 2/0224 297/284.1 |
| 5,263,765 A * | 11/1993 | Nagashima | ............ | A47C 7/467 297/284.11 |
| 5,658,050 A * | 8/1997 | Lorbiecki | ............ | B60N 2/4415 137/625.44 |
| 5,860,699 A * | 1/1999 | Weeks | .................... | A47C 7/467 297/284.1 |
| 6,014,784 A * | 1/2000 | Taylor | ................. | A61G 7/05776 297/284.6 |
| 6,092,249 A * | 7/2000 | Kamen | .................... | A47C 4/54 297/284.3 |
| 6,203,105 B1 * | 3/2001 | Rhodes, Jr. | .............. | A47C 4/54 297/284.1 |
| 7,120,527 B2 | 10/2006 | Prieto et al. | | |

(Continued)

FOREIGN PATENT DOCUMENTS

DE    19611073 B4    4/2004
EP       1245433 A2    10/2002

*Primary Examiner* — Timothy J Brindley
(74) *Attorney, Agent, or Firm* — Frank A. MacKenzie; Bejin Bieneman PLC

(57) ABSTRACT

A system for detecting that an occupant is present in a vehicle seat. The system includes a bladder disposed in the vehicle seat, a pressure sensor, and a fluid pump. A conduit provides a single line into the bladder, a first branch of the single line connected to the fluid pump, and a second branch connected to the pressure sensor. The pressure sensor is communicatively coupled to a computing device. The computing device is programmed to detect that the occupant is present in the vehicle seat according to two or more data, including a first pressure value and a second pressure value that is detected at a time following detection of the first pressure value.

20 Claims, 2 Drawing Sheets

(56) References Cited

U.S. PATENT DOCUMENTS

| | | | |
|---|---|---|---|
| 7,133,752 B2 | 11/2006 | Gray et al. | |
| 8,616,654 B2 * | 12/2013 | Zenk | B60N 2/0244 |
| | | | 297/284.3 |
| 8,641,142 B2 | 2/2014 | Griffin et al. | |
| 2002/0158453 A1 * | 10/2002 | Levine | B60K 23/02 |
| | | | 280/735 |
| 2003/0038517 A1 * | 2/2003 | Moran | B60N 2/448 |
| | | | 297/284.3 |
| 2003/0121704 A1 * | 7/2003 | Breed | B60N 2/002 |
| | | | 177/144 |
| 2005/0127728 A1 * | 6/2005 | Sugiyama | B60N 2/002 |
| | | | 297/284.3 |
| 2007/0120400 A1 | 5/2007 | Westh et al. | |
| 2009/0099490 A1 * | 4/2009 | Durt | A61H 9/0078 |
| | | | 601/115 |
| 2012/0086249 A1 * | 4/2012 | Hotary | B60N 2/0228 |
| | | | 297/284.3 |
| 2017/0043681 A1 * | 2/2017 | Seiller | B60N 2/0244 |
| 2017/0057379 A1 * | 3/2017 | Wang | B60N 2/0244 |

* cited by examiner

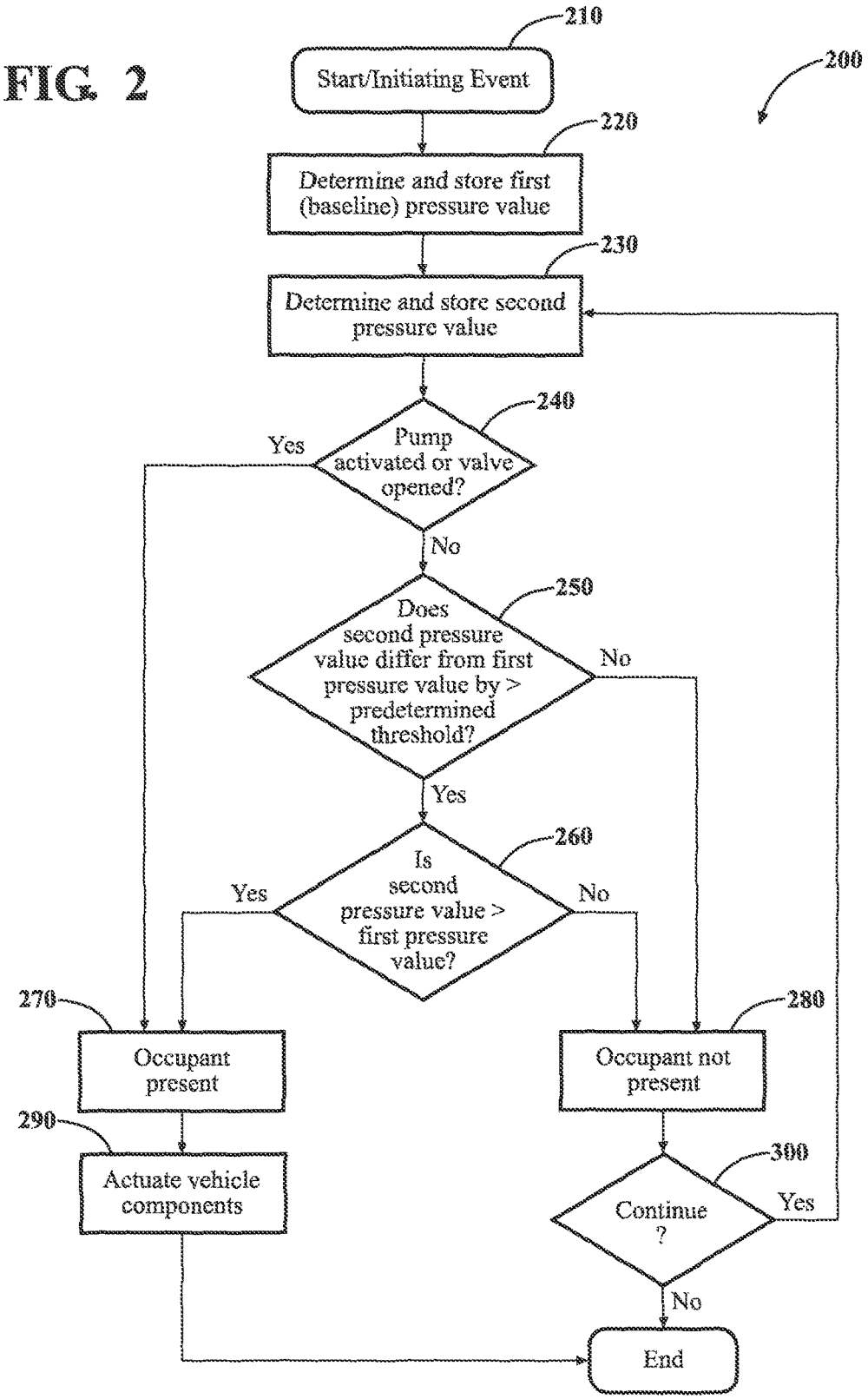

DETECTING OCCUPANT PRESENCE ON A VEHICLE SEAT

BACKGROUND

Present vehicles are equipped with systems for detecting the presence of an occupant in a vehicle seat. Occupant detection systems can, among other things, enable or disable devices such as airbags based on whether the vehicle seat is occupied. Such detection systems often require dedicated sensing systems that add cost and complexity to vehicle design and production.

BRIEF DESCRIPTION OF THE DRAWINGS

FIG. 2 is a diagram of an example of a process for detecting the presence of the occupant in the vehicle seat.

DETAILED DESCRIPTION

Figure 1:
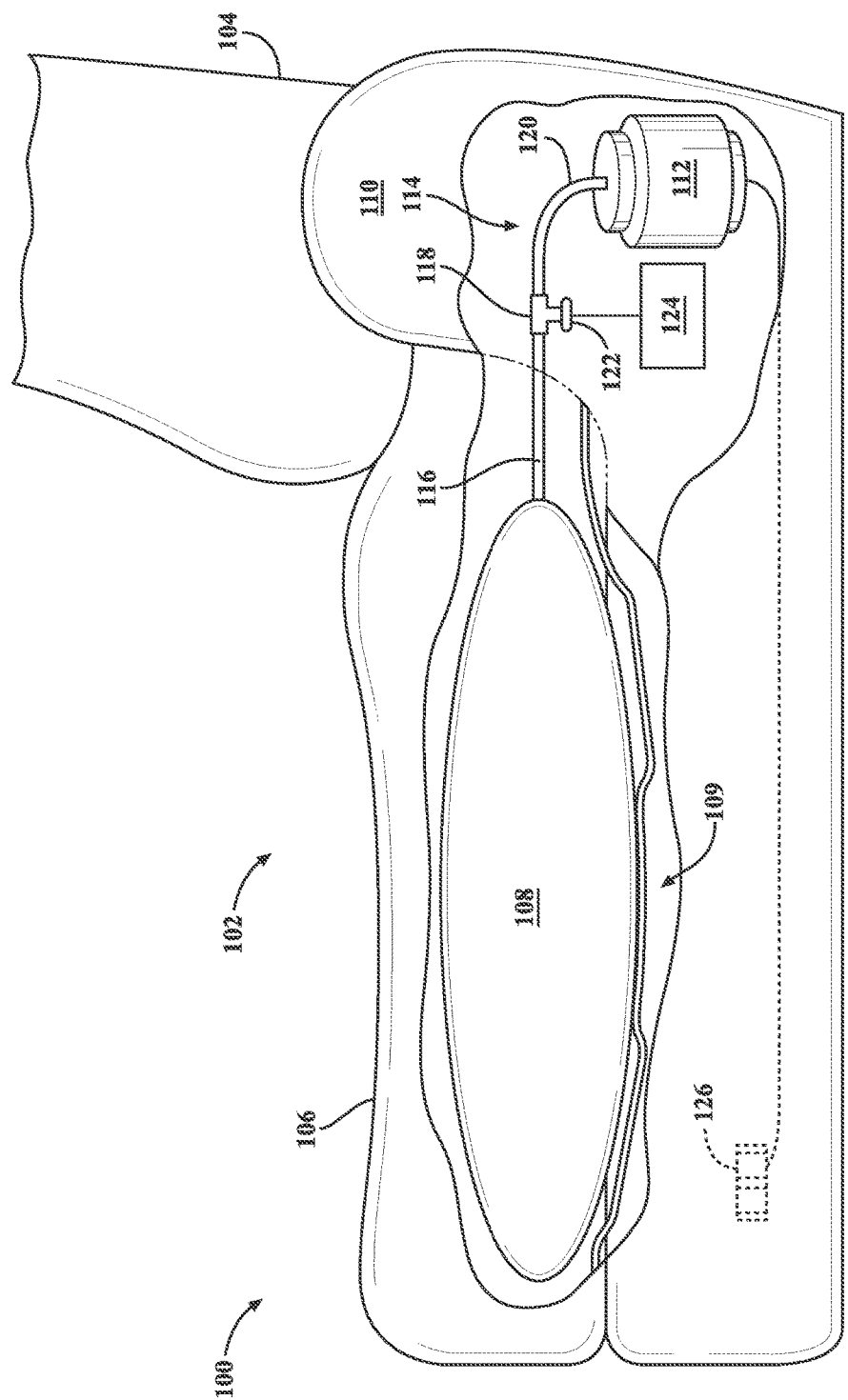
FIG. 1 is a cross-sectional view and block diagram of a vehicle seat occupant detection system.

With reference to FIG. 1, wherein like numerals indicate like parts throughout the several views, an occupant detection system 100 is included in a vehicle seat 102. A seat back 104 and seating portion 106 are connected in a known manner to form the seat 102. The seating portion 106 includes an inflatable bladder 108, i.e., the bladder 108 can retain a fluid, e.g., a gas such as air, the firmness of the bladder being controlled by an amount of air pumped into and/or removed from the bladder 108. The bladder 108 is typically disposed in a cavity 109 in a known manner, the cavity 109 being formed between an upper side of a seat base 110 and the seating portion 106. (Sides of the bladder 108 are shown a distance from the sides of the cavity 109, and the cavity 109 is shown at an exaggerated size, for purposes of illustration.)

The system 100 further includes, typically embedded in the seat base 110, a fluid pump 112, as well as a fluid conduit 114 between the pump 112 and the bladder 108. The conduit 114 may be made of a plastic hose or the like such as is known for connecting the pump 112 to the bladder 108 disposed in the seating portion 106 of the seat 102. The conduit 114 includes a first portion 116 that connects the bladder 108 to a branch element 118, e.g., the T-section shown in FIG. 1, which could be made of a rigid plastic material such as is known. The conduit 114 includes a second portion 120 that connects the branch element 118 to the pump 112.

The branch element 118 further connects the conduit 114 to a pressure sensor 122. A controller 124, e.g., a computing device having a processor and a memory, is communicatively coupled to the pressure sensor 122 to receive pressure data, e.g., such pressure data and communicative coupling being provided, e.g., in a known manner. Accordingly, a fluid pressure, e.g., air pressure, exerted by the bladder 108 may be measured with one or more data from the sensor 122 provided to the controller 124. Further, when a pumping operation of the pump 112 is completed, e.g., because an occupant has selected a switch 126 to add fluid to (i.e., inflate) or subtract fluid from (i.e., deflate) the bladder 108, a change in pressure of the bladder 108 may be detected.

A change in pressure of the bladder 108 may also be detected when an occupant enters or leaves the seat 102. Using readings from the sensor 122, and differences between respective pressure readings from the sensor 122, the controller 124 is programmed to determine that an occupant is present in the vehicle seat 102 according to two or more data from the pressure sensor 122. The two or more data may therefore include a first pressure value and a second pressure value that is detected at a time following detection of the first pressure value.

The vehicle seat 102, the seat back 104 and seating portion 106 typically each include foam cushion or the like as is known having properties suitable for sitting upon. The vehicle seat 102 may also include an outer layer of cloth, leather, or other suitable materials.

The bladder 108 is typically formed of a flexible and resilient material suitable for retaining fluid, such as air. For example, the bladder 108 could be formed of polyurethane, among other materials.

The conduit 114, as explained above, provides a passageway for the pump 112 to inflate and/or deflate the bladder 108 with fluid, e.g., air. Additionally and alternatively, the bladder 108 may include a valve (not shown) or other mechanisms for deflating the bladder with fluid. The conduit 114 is a hose or the like connecting to an opening (not shown) in the bladder 108. The conduit 114 contains a fluid at a pressure that is substantially the same as the fluid in the bladder 108. The conduit 114 includes the branch element 118 that connects the second portion 120 of the conduit 114 to the pump 112. The branch element 118 further connects the conduit 114 to a pressure sensor 122.

The pump 112 transports fluid through the conduit 114 to inflate and/or deflate the bladder 108. A switch 126 can be provided to actuate the pump 112 to inflate and/or deflate the bladder 108. Additionally and alternatively, the switch 126 can be in communication with a valve (not shown) or other mechanisms in the bladder to allow for evacuation of fluid. The term "switch" as used herein refers to any type or kind of user input mechanism that actuates the fluid pump to inflate and/or deflate the bladder, e.g., an instruction from the controller 124 or some other computing device to actuate the pump 112 could be encompassed by the present description of a "switch."

The pressure sensor 122 is connected to the branch element 118 of the conduit 114. The pressure sensor 122 provides pressure values that are communicated to the controller 124 on a vehicle network, e.g., wirelessly, via Ethernet, via a controller area network (CAN) bus, etc.

A first pressure value may be a pressure value detected by the pressure sensor 122 following an initiating event. The initiating event can include unlocking a vehicle door, opening the vehicle door, depressing a button on a key fob, etc. The initiating event activates the system 100. When the system 100 is activated, the pressure sensor 122 detects the first pressure value, and communicates the first pressure value to the controller 124. The controller 124 is programmed to store the first pressure value in the memory.

A second pressure value can be a pressure value detected by the pressure sensor 122 after detection of the first pressure value. The second pressure value may be a single pressure value detected by the pressure sensor 122. Additionally and alternatively, the second pressure value may be derived from an average of an aggregate of pressure values detected by the pressure sensor 122 over a period of time, e.g., 1 second.

The controller 124 is a computing device, as explained above, that includes a processor (not shown), a memory (not shown), for monitoring and/or controlling various vehicle components. For example, the memory may store instructions executable by the processor to determine that an occupant is present in the vehicle seat 102. Further, on making such determination, the controller 124 may be programmed to actuate one or more vehicle mechanisms, e.g., to actuate the vehicle seat 102 to move the vehicle seat 102 from a rearward position to a forward position. Further for example, the computing device may be programmed to actuate a vehicle steering wheel to move the steering wheel from a first position to a second position upon determining that an occupant is entering or leaving the seat 102.

FIG. 2 is a diagram of an example process 200 for detecting that the occupant is present in the vehicle seat 102. The process 200 begins in a block 210 with an initiating event. The initiating event can include unlocking a vehicle door, opening the vehicle door, depressing a button on a key fob, etc. The initiating event, which may be indicated on a vehicle network, e.g., a CAN bus, in a known manner, causes the controller 124 to activate the system 100.

Following the initiating event, in a block 220, the pressure sensor 122 detects a first, or baseline pressure value. The pressure sensor 122 communicates the first pressure value to the controller 124, and the controller 124 stores the first pressure value in the memory. The purpose of recording (storing) the first pressure value is to record a baseline pressure in the bladder 108, i.e., a pressure according to an amount of inflation of the bladder 108 prior to an occupant sitting in the seat 102.

After the block 220, in a block 230, the controller 124 determines a second pressure value. The second pressure value could be a single pressure reading from the sensor 122. However, because a single pressure reading is more likely to result in an erroneous determination concerning whether a seat is occupied, typically the pressure sensor 122 determines the second pressure value according to an aggregation of pressure readings from the sensor 122. The pressure sensor communicates the value or values to the controller 124 for determining the second pressure value. The aggregation is typically an average of pressure readings received over a specified period of time, e.g. 1 second. The second pressure value is stored in the memory of the controller 124.

Next, in a block 240, the controller 124 determines whether the pump 112 was actuated and/or the valve (not shown) in the bladder 108 was opened after the first pressure value was recorded. If the pump 112 has been actuated or the valve opened, then, in a block 270, the controller 124 determines that an occupant is present in the vehicle seat 102. Following the block 270, in a block 290, the controller 124 may provide an instruction to actuate the vehicle seat 102 to move the vehicle seat 102 from a rearward position to a forward position, and/or to actuate other vehicle components, e.g., a steering wheel, mirror, window, etc.

If the pump 112 has not been actuated and the valve not opened, then, in a block 250, the controller determines whether the second pressure value differs from the first pressure value by more than a predetermined threshold, e.g., 0.8 pounds per square inch (psi). If not, then the process moves to a block 280.

Next, in a block 260, the controller 124 determines whether the second pressure value, which has been determined to differ from the first pressure value by more than the predetermined threshold value, is greater than the first pressure value. If the second pressure value is greater than the first, or baseline pressure value by more than the threshold, then the process proceeds to a block 270. If the second pressure value is substantially equal to or less than the first pressure value by more than the threshold, then the process proceeds to a block 280.

In the block 270, the controller 124 determines that an occupant is present in the vehicle seat 102.

As discussed above, following the block 270, in the block 290, the controller 124 may provide an instruction to actuate the vehicle seat 102 to move the vehicle seat 102 from a rearward position to a forward position, and/or to actuate other vehicle components, e.g., a steering wheel, mirror, window, etc. The process ends after block 290.

Referring back to the block 280, the controller 124 has determined that the second pressure value is not greater then the first pressure value by more than the predetermined threshold, and, as a result, that an occupant is not present in the vehicle seat 102. If the controller 124 determines that an occupant is not present in the vehicle seat 102, then the process 200 proceeds to the block 300. As discussed above, in the block 300, the controller 124 determines whether the process 200 should continue. If controller 124 determines that the system is active, e.g., the vehicle remains powered on, the process 200 continues and returns to the block 230. If the controller 124 determines that the system is not active, the process 200 ends.

The controller 124 is generally configured for communications on a controller area network (CAN) bus or the like. The controller 124 may also have a connection to an onboard diagnostics connector (OBD II). Via the CAN bus, OBD II, Ethernet, and/or other wired or wireless mechanisms, the controller 124 may transmit messages to various devices in a vehicle and/or receive messages from the various devices, e.g., controllers, actuators, sensors, etc., including the pressure sensor. Alternatively and additionally, in cases where the controller actually comprises multiple devices, the CAN bus or the like may be used for communications between devices represented as the controller 124 in this disclosure. In addition, the controller 124 may be configured for communicating with a network, which may include various wired and/or wireless networking technologies, e.g., cellular, Bluetooth, wired and/or wireless packet networks, etc.

The controller 124 generally includes instructions executable by one or more computing devices such as those identified herein, and for carrying out blocks or steps of processes described herein. Computer☐executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer☐readable medium, etc., and executes these instructions, thereby performing one or more processes, including one or more of the processes described herein. Such instructions and other data may be stored and transmitted using a variety of computer☐readable media. A file in the computing device is generally a collection of data stored on a computer readable medium, such as a storage medium, a random access memory, etc.

A computer☐readable medium includes any medium that participates in providing data (e.g., instructions), which may be read by a computer. Such a medium may take many forms, including, but not limited to, non☐volatile media, volatile media, etc. Non☐volatile media include, for example, optical or magnetic disks and other persistent memory. Volatile media include dynamic random access memory (DRAM), which typically constitutes a main memory. Common forms of computer☐readable media include, for example, a floppy disk, a flexible disk, hard disk, magnetic tape, any other magnetic medium, a CD☐ROM, DVD, any other optical medium, punch cards, paper tape, any other physical medium with patterns of holes, a RAM, a PROM, an EPROM, a FLASH–EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A system comprising:
   a bladder disposed in a vehicle seat;
   a pump;
   a pressure sensor;
   a conduit that connects the pump to the bladder;
   a T-section that connects the conduit to the pressure sensor;
   a switch to actuate the pump to at least one of inflate and deflate the bladder with fluid; and
   a controller having a processor and a memory, the memory having stored instructions executable by the processor to detect that the pump has been actuated, and then, if actuation of the pump was detected, determine that an occupant is present in a vehicle seat according to two or more data received from the pressure sensor.

2. The system of claim 1, wherein the controller is programmed to store a first pressure value upon an initiating event.

3. The system of claim 2, wherein the initiating event is one of when a vehicle door is opened and unlocked.

4. The system of claim 1, wherein the data include a first pressure value and a second pressure value.

5. The system of claim 4, wherein the memory storing instructions executable by the processor further determines that the occupant is present in the vehicle seat when the second pressure value is greater than the first pressure value.

6. The system of claim 5, wherein the memory storing instructions executable by the processor further determines the second pressure value from an average of an aggregate of pressure values detected by the pressure sensor over a predetermined period of time.

7. The system of claim 6, wherein the memory storing instructions executable by the processor further determines that an occupant is present in the seat when the second pressure value differs from the first pressure value by more than a predetermined threshold.

8. The system of claim 4, wherein the memory storing instructions executable by the processor further determines that an occupant is not present in the vehicle seat when the second pressure value is substantially equal to or less than the first pressure value.

9. The system of claim 8, wherein the memory storing instructions executable by the processor further determines the second pressure value from an average of an aggregate of pressure values detected by the pressure sensor over a specified period of time.

10. The system of claim 9, wherein the memory storing instructions executable by the processor determines that an occupant is present in the seat when the second pressure value differs from the first pressure value by more than a predetermined threshold.

11. The system of claim 1, wherein the memory storing instructions executable by the processor further actuates the vehicle seat to move from a rearward position to a forward position when the computing device determines that the occupant is present in the vehicle seat.

12. The system of claim 1, wherein the memory storing instructions executable by the processor further actuates a steering wheel to move from a first position to a second position when the controller determines the occupant is present in the vehicle seat.

13. The system of claim 1, wherein the switch is occupant-selectable.

14. A system, comprising:
    a bladder disposed in a vehicle seat;
    a pump;
    a pressure sensor;
    a conduit that connects the pump to the bladder;
    a T-section that connects the conduit to the pressure sensor;
    a switch to actuate the pump to at least one of inflate and deflate the bladder with fluid; and
    a means for detecting that the pump has been actuated, and then, if actuation of the pump was detected, determining that an occupant is present in a vehicle seat according to two or more data received from the pressure sensor.

15. The system of claim 14, further comprising a means for storing a first pressure value upon an initiating event.

16. The system of claim 15, wherein the initiating event is one of when a vehicle door is opened and unlocked.

17. The system of claim 14, wherein the data include a first pressure value and a second pressure value.

18. The system of claim 17, further comprising means for determining the second pressure value from an average of an aggregate of pressure values detected by the pressure sensor over a predetermined period of time.

19. The system of claim 17, further comprising means for determining that an occupant is not present in the vehicle seat when the second pressure value is substantially equal to or less than the first pressure value.

20. The system of claim 14, further comprising means for actuating a steering wheel to move from a first position to a second position when the controller determines the occupant is present in the vehicle seat.

* * * * *